United States Patent
Colombo

(10) Patent No.: US 6,402,202 B1
(45) Date of Patent: Jun. 11, 2002

(54) TWO-WAY ROTARY JOINT FOR FLUIDS

(75) Inventor: Giorgio Colombo, Legnano (IT)

(73) Assignee: Turian Eng. SRL, Legnano (IT)

( * ) Notice: Subject to any disclaimer, the term of this patent is extended or adjusted under 35 U.S.C. 154(b) by 0 days.

(21) Appl. No.: 09/463,856

(22) PCT Filed: Jun. 16, 1998

(86) PCT No.: PCT/EP98/03995

§ 371 (c)(1),
(2), (4) Date: Feb. 29, 2000

(87) PCT Pub. No.: WO99/06755

PCT Pub. Date: Feb. 11, 1999

(30) Foreign Application Priority Data

Jul. 30, 1997 (IT) ......................................... MI97A01827

(51) Int. Cl.[7] .................................................. F16L 27/00
(52) U.S. Cl. .................. 285/121.1; 285/190; 285/121.3; 285/121.4; 285/121.5; 285/121.6
(58) Field of Search ........................... 285/121.1, 121.3, 285/121.4, 121.5, 121.6, 190

(56) References Cited

U.S. PATENT DOCUMENTS

| | | | |
|---|---|---|---|
| 2,412,287 A | | 12/1946 | Phillips |
| 2,460,872 A | * | 2/1949 | Carpenter ................. 285/121.5 |
| 2,626,166 A | * | 1/1953 | Fawick ..................... 285/121.3 |
| 2,693,373 A | * | 11/1954 | Tremolada ............... 285/121.4 |
| 2,701,146 A | * | 2/1955 | Warren ..................... 285/121.5 |
| 2,805,087 A | * | 9/1957 | Shaw et al. .............. 285/121.4 |
| 4,928,997 A | * | 5/1990 | Reisener et al. ............ 285/190 |
| 5,110,159 A | | 5/1992 | Herold et al. |
| 5,702,130 A | * | 12/1997 | Jostein ..................... 285/121.6 |
| 6,073,970 A | * | 6/2000 | Ott et al. ..................... 285/190 |
| 6,299,219 B1 | * | 10/2001 | Hoegger ..................... 285/190 |

FOREIGN PATENT DOCUMENTS

| | | |
|---|---|---|
| GB | 764454 | 1/1955 |
| GB | 2 292 778 | 8/1994 |

* cited by examiner

Primary Examiner—Lynne H. Browne
Assistant Examiner—Aaron Dunwoody
(74) Attorney, Agent, or Firm—Paul & Paul

(57) ABSTRACT

A two-way rotary joint for fluids is disclosed. An illustrative example of the rotary joint includes a main body provided with two inlet ports, and a rotor rotatably coupled to the main body. The rotor has two passages each in communication with a respective one of the inlet ports in the main body. A ring-shaped hub is rotatably supported relative to the rotor and has a radial outlet port in communication with one of the passages in the rotor.

19 Claims, 3 Drawing Sheets

TWO-WAY ROTARY JOINT FOR FLUIDS

TECHNICAL FIELD

The present invention refers to a rotary joint for fluids, that is a device used to transmit a pressurized fluid from a fixed part to a rotating one while preventing spilling of the fluid through proper seals or gaskets.

BACKGROUND ART

A rotary joint generally comprises a fixed part named stator or body, and a rotary or rotatable part named rotor. Such rotary joint may be provided either with only one passage (or way), or with two or more passages independent from each other, according to the required applications in a plant.

The known rotary joints are of the type comprising two independent passages each comprising one (axial or radial) inlet port provided in the stator. One of the passages is provided with an axial outlet port and the other passage is provided with a radial outlet port, with both outlet ports being located in the rotor. Joints of this type are generally fitted to the bottom of oleodynamic or pneumatic cylinders of take-up reels of metal sheets.

The two passages or ways are used to drive the cylinder, i.e. one way is used for the rod extension and the other for retracting the rod, respectively.

Two examples of rotary joints of this type, with an axial outlet port 21 and a radial outlet port 22, are described in the partially cross-sectioned side views of FIGS. 3 and 4. The body 10 of the joint includes two inlets 11 and 12, connected to the outlets 21 and 22 respectively, with the body being further secured to the cylinder (not shown in the Figures) by means of a mounting on the cylinder bottom.

The known devices of this type show an inconvenience due to fact that the joint rotor has to be threaded for being connected to the cylinder bottom, and therefore it is not always possible to obtain a desired angular arrangement, after the parts have been tightened together. This inconvenience is particularly felt in the joint maintenance operations, for example when replacement of the joint is needed.

DISCLOSURE OF THE INVENTION

It is an an object of present invention to overcome the above mentioned drawback, and particularly to provide a two-way rotary joint having a radial outlet port that allows a positioning thereof according to any given or desired direction.

According to the invention, this object is accomplished by means of a rotary joint provided with a rotor having a radial outlet port that is angularly orientable independently from the axial outlet port of the rotor.

Further advantageous characteristics will become apparent upon study of the Detailed Description of Preferred Embodiments and the appended drawings.

BRIEF DESCRIPTION OF THE DRAWINGS

The invention will now be disclosed with reference to the attached drawings illustrating preferred non-limiting embodiments thereof, in which.

Throughout all the Figures the same numeral references have been used to indicate the same or equivalent parts.

DETAILED DESCRIPTION OF PREFERRED EMBODIMENTS

Figure 1:
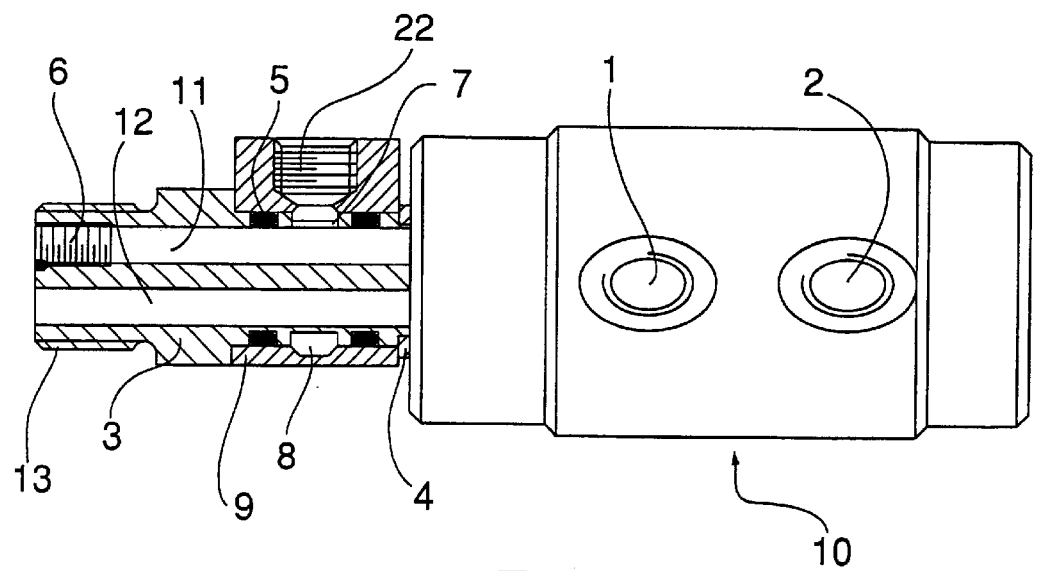
FIGS. 1 and 2 are partially cross-sectioned side views illustrating two embodiments of a rotary joint capable of being oriented along a given direction according to the present invention.

With reference to FIG. 1, a rotary joint according to the invention comprises a body 10 and a rotor 3 provided with a threaded end portion 13 and hexagonal planes for locking it to the cylinder bottom.

In the Figures, both inlet openings 1 and 2 in body or stator 10 are radial, however they could also be axially extending ports.

A hub 9, housed in a ring-shaped seat, is rotatably fitted to rotor 3, around the part far from the threaded portion. A spacer 4, inserted between the hub and the body 10 of the joint prevents the hub axial displacement.

Two axial passages or ducts 11 and 12 are formed in the rotor for the fluid passage, and one of them (passage 11 in FIG. 1) is closed by an end plug 6 and connected through a radial hole 7 to a ring-shaped channel 8 that in turn is provided with a radial outlet port 22 formed in the hub 9.

In rotor 3 two ring-shaped grooves are provided sideways to the channel 8 which make up seats for as many sealing gaskets 5 having a circular cross-section (e.g. O rings). These gaskets prevent fluid from spilling outside and allow to angularly orient the hub 9—and therefore the radial outlet 22—along 4 outlet 22 of the rotary joint according to the invention can be oriented in the desired angular direction.

According to another embodiment (schematically shown in FIG. 5), the channels for receiving the sealing gaskets 5 can be formed in the hub 9.

Figure 2:
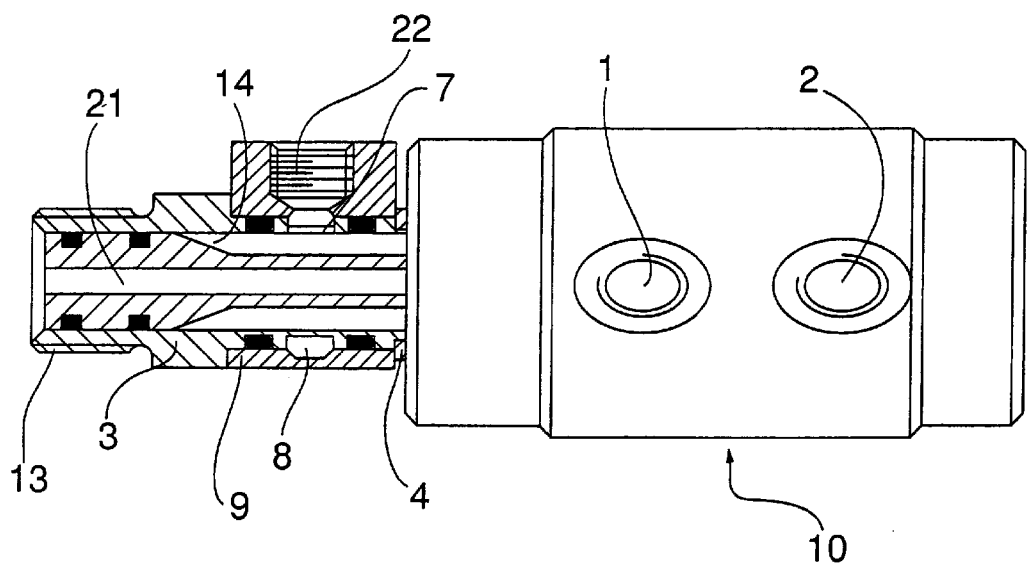
Figure 3:
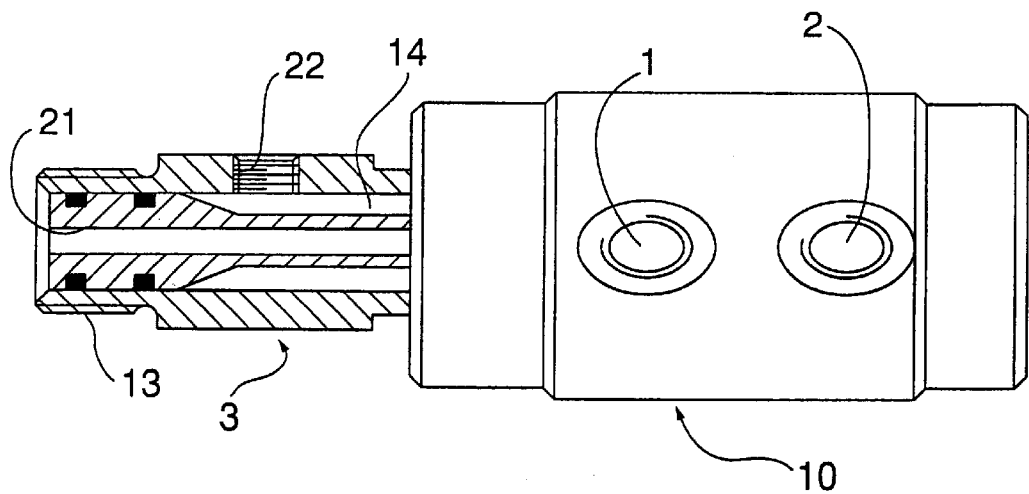
FIGS. 3 and 4, already described, illustrate two-way rotary joints according to the prior art.
Figure 4:
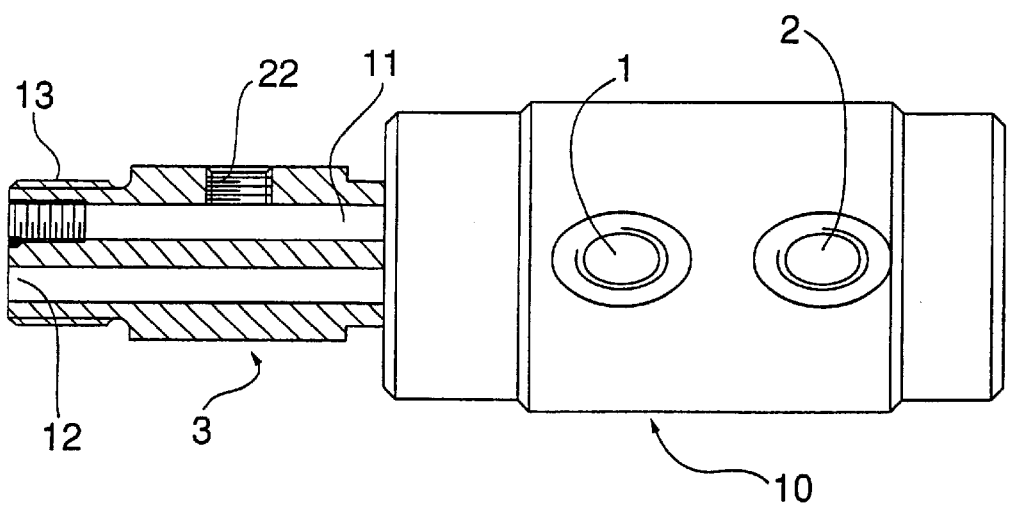

FIG. 2 shows another embodiment of an orientable joint according to the invention, in which only one axial duct 21 is provided in the rotor, particularly with its axis coincident with that of the rotor, and an annular chamber 14 is provided communicating with the channel 8 which in turn opens on the outlet 22. Although not shown in the drawings, also the other outlet port (11 or 21, depending on which Figure) can be a radial outlet, that can be oriented in an independent manner from the other outlet port.

Figure 5:
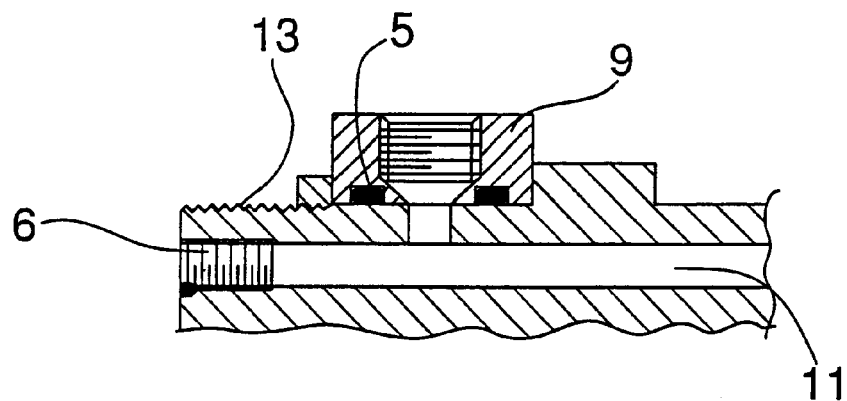
FIGS. 5 and 6 show some details of two embodiments of the sealing system.

In the embodiment of the seal system shown in the detail view of FIG. 5, it is also provided that the orientable hub 9 housing the gaskets 5 is mounted at the end of the threaded portion 13.

Figure 6:
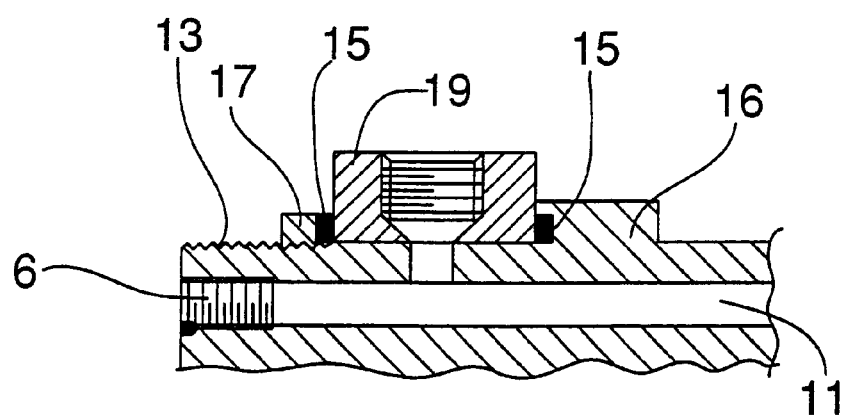

According to the embodiment shown in FIG. 6, the orientable hub 19 is fitted at the end of the threaded portion 13, while the gaskets 15 are of a flat type, and located between shoulders 16, 17.

Although the invention has been described with reference to preferred embodiments, it is generally susceptible of other applications and changes that fall within the scope of the invention, as will become evident to the skilled in the art.

INDUSTRIAL APPLICABILITY

The invention is applicable to a rotary joint for fluids used to transmit a pressurized fluid in machinery such as, for example, take-up reels of metal sheets.

What is claimed is:

1. A rotary joint for fluids comprising:
   a main body provided with a first inlet port and a second inlet port;

a rotor rotatably coupled to said main body and provided with two passages communicating with said first and second inlet ports, respectively, said rotor having at least one outlet port communicating with a first one of said two passages; and a hub having a radial outlet port, said hub being rotatably supported around said rotor with said radial outlet port in communication with a second one of said two passages, whereby said radial outlet port is angularly orientable independently from said at least one outlet port of said rotor.

2. The rotary joint for fluids according to claim 1, wherein said at least one outlet port of said rotor is an axial outlet port.

3. A rotary joint for fluids comprising:

a main body provided with a first inlet port and a second inlet port;

a rotor rotatably coupled to said main body and provided with at least one outlet port communicating with a respective one of said first and second inlet ports; and a hub fitted to said rotor through sealing means, said hub and said rotor forming an assembly having an annular channel formed between said hub and said rotor, said hub being provided with an outlet port communicating with said annular channel, said annular channel further communicating, through a radial hole in said rotor, with a respective one of said first and second inlet ports.

4. The rotary joint for fluids according to claim 3, wherein said hub is ring-shaped.

5. The rotary joint for fluids according to claim 3, wherein said rotor is provided with two axial ducts, one of which communicates with said annular channel, while the other is closed by a plug.

6. The rotary joint for fluids according to claim 3, wherein said rotor is provided with an axial duct and an annular chamber that is in communication with said annular channel.

7. The rotary joint for fluids according to claim 3, wherein said rotor is provided with a threaded portion, said hub is mounted intermediate said threaded portion and said main body, and a spacer is inserted between said hub and said main body to prevent any axial displacement of said hub.

8. The rotary joint for fluids according to claim 3, wherein said sealing means includes gaskets having circular cross-sections and located in seats formed between said hub and said rotor.

9. The rotary joint for fluids according to claim 3, wherein said sealing means includes gaskets having flat cross-sections.

10. The rotary joint for fluids according to claim 3, wherein said at least one outlet port of said rotor is an axial outlet port.

11. The rotary joint for fluids according to claim 3, wherein said outlet port of said hub is a radial outlet port.

12. A rotary joint for fluids comprising:

a main body provided with a first inlet port and a second inlet port;

a rotor rotatably coupled to said main body and provided with at least one outlet port communicating with a respective one of said first and second inlet ports; and a hub fitted to said rotor through sealing means, said hub being provided with an annular channel and with a radial outlet port communicating with said annular channel, said annular channel further communicating, through a radial hole in said rotor, with a respective one of said first and second inlet ports.

13. The rotary joint for fluids according to claim 12, wherein said hub is ring-shaped.

14. The rotary joint for fluids according to claim 12, wherein said rotor is provided with two axial ducts, one of which communicates with said annular channel, while the other is closed by a plug.

15. The rotary joint for fluids according to claim 12, wherein said rotor is provided with an axial duct and an annular chamber that is in communication with said annular channel.

16. The rotary joint for fluids according to claim 12, wherein said rotor is provided with a threaded portion, said hub is mounted intermediate said threaded portion and said main body, and a spacer is inserted between said hub and said main body to prevent any axial displacement of said hub.

17. The rotary joint for fluids according to claim 12, wherein said sealing means includes gaskets having circular cross-sections and located in seats formed between said hub and said rotor.

18. The rotary joint for fluids according to claim 12, wherein said sealing means includes gaskets having flat cross-sections.

19. The rotary joint for fluids according to claim 12, wherein said at least one outlet port of said rotor is an axial outlet port.

* * * * *